Feb. 18, 1958 R. OLSEN 2,824,226

OSCILLATOR SYSTEM

Filed April 30, 1954

INVENTOR.

Robert Olsen

BY

Attorneys

United States Patent Office 2,824,226

Patented Feb. 18, 1958

2,824,226

OSCILLATOR SYSTEM

Robert Olsen, East Meadow, N. Y., assignor, by mesne assignments, to the United States of America as represented by the Secretary of the Navy Application April 30, 1954, Serial No. 426,948

4 Claims. (Cl. 250—27)

The present invention relates to a novel and improved electronic circuit and more particularly to a novel and improved electronic circuit for producing and making use of a periodic series of unique pulses which are delayed one from another by a predetermined interval.

In a number of electronic systems now known to the art it is desirable to produce voltage pulses of predetermined and controlled time duration. For example, such pulses are often used as synchronization pulses in television equipment or in transmitting oscillators of radar systems. Moreover, in the use of such circuits it is also often desirable to reduce the physical size of power supply components by using suitable pulsed power supply circuits. Although attempts have been made heretofore to accomplish these objectives in various ways, considerable difficulty has been experienced in the past in devising suitable apparatus which is simple in construction and reliable in use.

It is a principal object of the present invention to provide a novel and improved pulse generating circuit. It is a further object of the present invention to provide a novel and improved electronic circuit which will periodically pulse a power supply unit or the like and subsequently generate a synchronizing signal after a predetermined delay.

Figure 1:
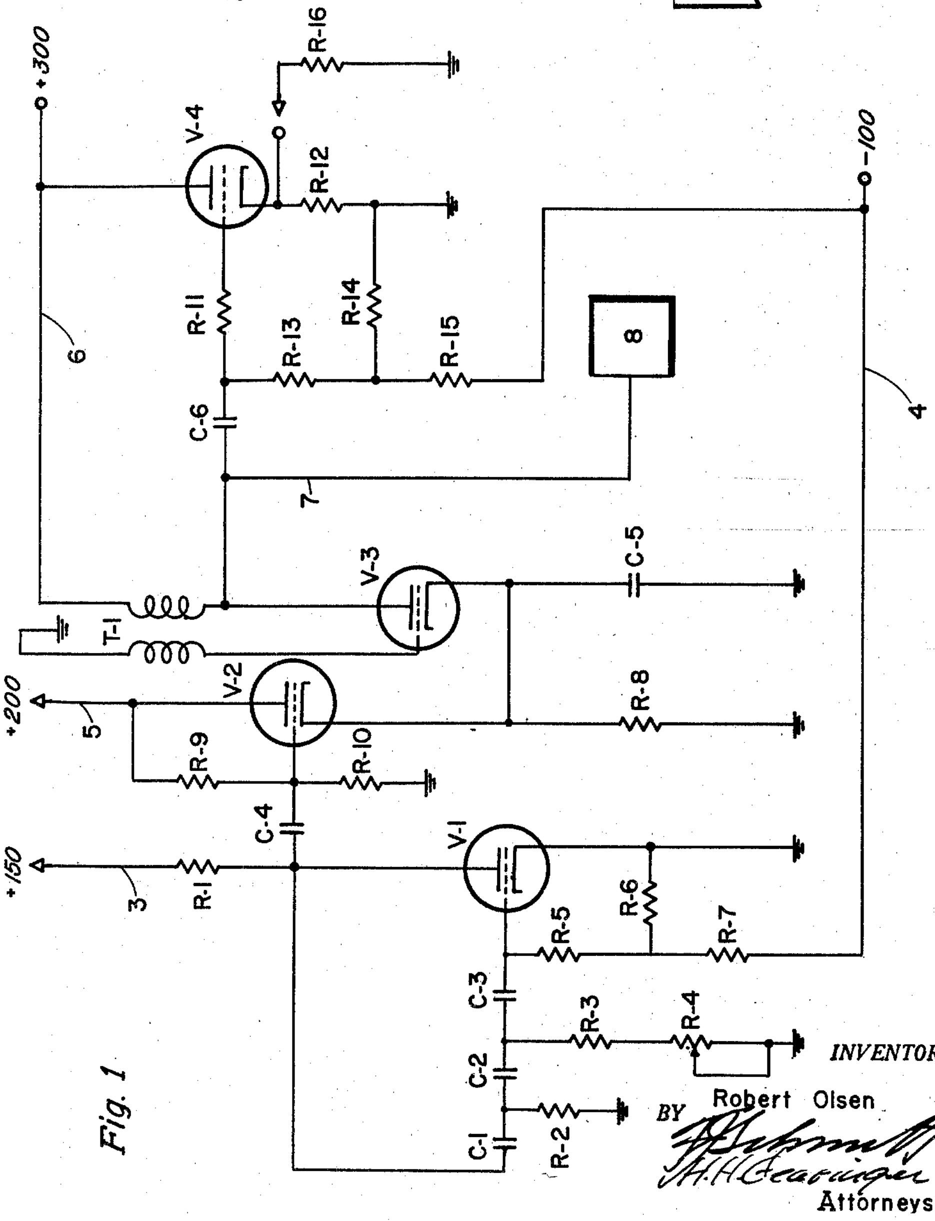

Other objects and many of the attendant advantages of this invention will be readily appreciated as the same becomes better understood by reference to the following detailed description when considered in connection with the accompanying drawings wherein:

Figure 1 is a schematic circuit diagram of a preferred embodiment of the present invention.

Figure 2A:
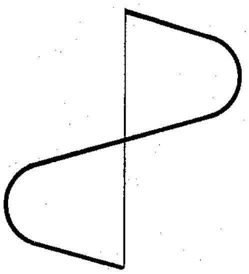
Figure 2B:
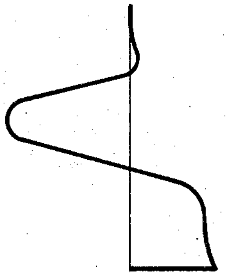

Figures 2*a* and 2*b* are diagrams showing respectively the output wave forms of the phase shift oscillator and the blocking oscillator in the apparatus in Figure 1.

Figure 2C:
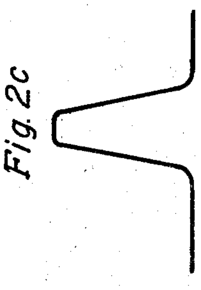

Figure 2*c* is a diagram of the output of the second cathode follower circuit shown in the apparatus in Figure 1.

In general the improved apparatus of the present invention includes a single swing blocking oscillator which is designed and arranged to periodically produce a pulse having a relatively large overshoot, means which are responsive to the leading edge of the pulse for producing a power supply triggering signal, and means which are responsive to the pulse overshoot for producing a delayed synchronizing signal. It has been found that the above described objectives may be readily accomplished in a simple, compact and reliable fashion in this way.

A preferred embodiment of the present invention is illustrated in Figure 1 of the drawing. As shown therein the plate circuit of the sine wave phase shift oscillator tube V–1 extends from the positive 150 volt supply line 3 through the resistor R–1 and the tube to ground. The resistance capacitance L-sections of the plate to grid feedback circuit of V–1 include the capacitor C–1 and the resistor R–2, the capacitor C–2 and resistors R–3 and R–4 and the capaictor C–3 and resistors R–5 and R–6. The junction of resistors R–5 and R–6 in the third mentioned L-section of the feedback circuit is preferably connected as shown through resistor R–7 to the negative 100 volt grid biasing supply line 4.

The plate of the oscillator V–1 is preferably coupled to the grid of the triode V–2 in the cathode follower circuit by means of the condenser C–4. The plate circuit of V–2 extends from the positive 200 volt supply line 5 through the tube and the resistor R–8 to ground. The grid of V–2 is also preferably connected to the junction of resistors R–9 and R–10 which are connected in series between the positive 200 volt supply line 5 and ground.

The output of the cathode follower V–2 is preferably connected as shown to the cathode of the triode V–3. The plate circuit of V–3 extends from the positive 300 volt line 6 through the primary winding of the transformer T–1, the tube and the condenser C–5 to ground. The secondary winding of transformer T–1 is preferably connected as shown between the grid of V–3 and ground.

The plate of the blocking oscillator tube V–3 is preferably connected to the output supply line 7 which as will be more apparent hereinafter is adapted to energize the conventional pulse-type power supply unit 8 or any other suitable equipment. The plate of V–3 is also preferably connected to the grid of the cathode follower V–4 through the condenser C–6 and the resistor R–11. The plate circuit of V–4 extends from the positive 300 volt supply line 6 through the tube and resistor R–12 to ground. The junction of condenser C–6 and resistor R–11 is coupled by means of resistor R–13 to the junction of resistors R–14 and R–15 which are connected in series between the negative 100 volt supply line 4 and ground. As will be more apparent hereinafter the cathode of the cathode follower circuit is adapted to provide a predetermined synchronizing pulse.

In operation the substantially sinusoidal output of the phase shift oscillator circuit which is shown in Figure 2*a* of the drawing is directed through the condenser C–4 to the grid of the cathode follower V–2. The cathode follower is provided to isolate the oscillator from the remainder of the circuit and to thereby reduce the loading effect on the oscillator. The substantially sinusoidal output of the cathode follower is then used to energize the cathode circuit of the blocking oscillator V–3. The capacitor C–5 and the resistor R–8 are preferably selected such that when the sinewave signal energizes the normally deenergized blocking oscillator, the single swing pulse having the relatively large overshoot shown in Figure 2*b* is produced. By further properly selecting the various other parameters of the blocking oscillator circuit the time lapse between the leading edge of each pulse and the synchronizing overshoot as well as the magnitude and duration of the overshoot itself may be accurately controlled.

As indicated heretofore, the leading edge of this output pulse of the blocking oscillator is preferably used to energize the pulse type power supply unit 8 or any other suitable piece of apparatus. The output pulse from the blocking oscillator V–3 is also preferably directed through the condenser C–6 and the resistor R–11 to the grid of the cathode follower V–4 from which the output synchronizing signal shown in Figure 2C is obtained at the cathode of V–4. This synchronizing pulse is then delivered to any suitable load circuit or the like which is designated in the drawing by the resistor R–16.

Although the electron tubes illustrated in the drawings and disclosed heretofore are shown and described to be triodes, it is to be understood that tetrodes, pentodes and other conventional type tubes could also be used without departing from the spirit or scope of the present invention.

Obviously many modifications and variation of the present invention are possible in the light of the above teachings. It is therefore to be understood that within the scope of the appended claims the invention may be practiced otherwise than as specifically described.

What is claimed is:

1. A pulse forming circuit comprising a single swing blocking oscillator which is designed and arranged to periodically produce a pulse having a relatively large overshoot; a normally deenergized power supply unit; means responsive to the leading edge of the pulse for energizing the power supply unit; and means responsive to the pulse overshoot for producing a delayed synchronizing signal.

2. A pulse forming circuit comprising a single swing blocking oscillator which is designed and arranged to periodically produce a pulse having a relatively large overshoot; means for controlling the periodic energization of the blocking oscillator; a normally deenergized power supply unit; means responsive to the leading edge of the pulse for energizing the power supply unit; and means responsive to the pulse overshoot for producing a delayed synchronizing signal.

3. A pulse forming circuit comprising a single swing blocking oscillator which is designed and arranged to periodically produce a pulse having a relatively large overshoot; a phase shift oscillator for controlling the periodic energization of the blocking oscillator; a normally deenergized power supply unit; means responsive to the leading edge of the pulse for energizing the power supply unit; and means responsive to the pulse overshoot for producing a delayed synchronizing signal.

4. A pulse generating system comprising a phase-shift sine wave oscillator; a first cathode follower circuit; means for operatively coupling the output of the oscillator to the control grid of the cathode follower circuit; a single swing blocking oscillator which is designed and arranged to produce a pulse having a relatively large overshoot; means for operatively coupling the output of the cathode follower circuit to the cathode circuit of the blocking oscillator; a normally deenergized power supply unit; means responsive to the leading edge of the said pulse for energizing the power supply unit; and a second cathode follower circuit which is coupled to the output of the blocking oscillator and which is responsive to the pulse overshoot for producing a delayed synchronizing signal.

References Cited in the file of this patent

UNITED STATES PATENTS

| | | |
|---|---|---|
| 2,415,567 | Schoenfeld | Feb. 11, 1947 |
| 2,496,912 | Grosdoff | Feb. 7, 1950 |
| 2,543,737 | Houghton | Feb. 27, 1951 |
| 2,565,490 | Fleming | Aug. 28, 1951 |
| 2,625,652 | Krulikoski, et al. | Jan. 13, 1953 |
| 2,653,236 | Phelan | Sept. 22, 1953 |